(12) United States Patent
Baldwin et al.

(10) Patent No.: US 7,589,791 B2
(45) Date of Patent: Sep. 15, 2009

(54) METHODS AND SYSTEMS FOR INDEPENDENTLY CONTROLLING THE PRESENTATION SPEED OF DIGITAL VIDEO FRAMES AND DIGITAL AUDIO SAMPLES

(75) Inventors: James A. Baldwin, Emerald Hills, CA (US); James A. Lundblad, Mountain View, CA (US); Louis F. Coffin, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/355,671

(22) Filed: Jan. 16, 2009

(65) Prior Publication Data

US 2009/0122192 A1    May 14, 2009

Related U.S. Application Data

(63) Continuation of application No. 11/248,550, filed on Oct. 12, 2005, now Pat. No. 7,495,705, which is a continuation of application No. 09/652,058, filed on Aug. 31, 2000, now Pat. No. 6,975,363.

(51) Int. Cl.
   *H04N 5/04* (2006.01)
(52) U.S. Cl. ..................................... 348/512
(58) Field of Classification Search ................. 348/512, 348/515, 516, 518, 423.1, 425.4; 375/240.28; 386/66, 71, 84, 85
   See application file for complete search history.

(56) References Cited

U.S. PATENT DOCUMENTS

| 5,396,492 | A | * | 3/1995 | Lien ........................... 370/412 |
| 5,603,016 | A | * | 2/1997 | Davies ....................... 713/400 |
| 5,959,684 | A | * | 9/1999 | Tan et al. .................... 348/515 |
| 6,072,832 | A | * | 6/2000 | Katto .................... 375/240.28 |
| 6,275,267 | B1 | * | 8/2001 | Kobayashi .................. 348/555 |
| 6,363,207 | B1 | * | 3/2002 | Duruoz et al. ................ 386/68 |
| 6,429,902 | B1 | * | 8/2002 | Har-Chen et al. ........... 348/518 |
| 6,477,204 | B1 | * | 11/2002 | Fukushima et al. .... 375/240.28 |
| 6,516,005 | B1 | * | 2/2003 | Murayama et al. .......... 370/503 |
| 6,744,815 | B1 | * | 6/2004 | Sackstein et al. ............ 375/240 |
| 6,975,363 | B1 | * | 12/2005 | Baldwin et al. ............. 348/512 |
| 7,039,070 | B2 | * | 5/2006 | Kawakatsu ................. 370/503 |
| 7,495,705 | B2 | * | 2/2009 | Baldwin et al. ............. 348/512 |

* cited by examiner

*Primary Examiner*—Paulos M Natnael
(74) *Attorney, Agent, or Firm*—Workman Nydegger (57) ABSTRACT

A digital receiver contains a local video clock that controls the video presentation speed and a local audio clock that controls the audio presentation speed separately and independently of the video presentation speed. To control the video presentation speed, a comparator compares a program clock reference in a video packet with a local time. A video clock controller then speeds up or slows down the video clock as needed to be back on schedule. To control the audio presentation speed, a comparator compares a program clock reference in an audio packet with the local time. An audio clock controller then speeds up or slows down the audio clock as needed to be back on schedule.

12 Claims, 5 Drawing Sheets

METHODS AND SYSTEMS FOR INDEPENDENTLY CONTROLLING THE PRESENTATION SPEED OF DIGITAL VIDEO FRAMES AND DIGITAL AUDIO SAMPLES

CROSS-REFERENCE TO RELATED APPLICATIONS

This application is a continuation of application Ser. No. 11/248,550 filed Oct. 12, 2005, and entitled "METHODS AND SYSTEMS FOR INDEPENDENTLY CONTROLLING THE PRESENTATION SPEED OF DIGITAL VIDEO FRAMES AND DIGITAL AUDIO SAMPLES", which is a continuation of application Ser. No. 09/652,058 filed Aug. 31, 2000, and entitled "METHODS AND SYSTEMS FOR INDEPENDENTLY CONTROLLING THE PRESENTATION SPEED OF DIGITAL VIDEO FRAMES AND DIGITAL AUDIO SAMPLES", now issued as U.S. Pat. No. 6,975,363. The foregoing patents and patent applications are incorporated herein by reference in their entirety.

FIELD OF THE INVENTION

The present invention pertains to the field of digital audio/video signal receivers. More particularly, the present invention relates to methods and systems of independently controlling the presentation speeds of digital video frames and digital audio samples.

BACKGROUND OF THE INVENTION

Television broadcasts have become a powerful and pervasive source of information and entertainment. A television receiver commonly called a "television set" receives a television signal that was previously broadcasted by a television station. More recently, some computers have been adapted to receive television signals and present the corresponding television program on the computer monitor. Regardless of the receiver type or display device, these television signals typically include a video component from which a moving image is formed, and an audio component that represents sound conventionally associated with the moving image. Digital television broadcasts are segmented into digital packets of information with some of the packets containing video information (hereinafter, "digital video packets") and some of the packets containing audio information (hereinafter, "digital audio packets").

The video component of the digital television signal represents a sequence of "frames", each frame representing a screenful of image data. In full-motion video, this sequence of frames is displayed at such a rate that the average human viewer cannot distinguish the individual frames and differentiate one frame from the next. Instead, the human viewer perceives a single continuous moving image. This psychological effect can be achieved by a display rate of at least 24 frames per second. In the NTSC (National Television Standards Committee) digital television standard, frames are transmitted at a frame rate of 29.94 frames per second.

The audio component of a digital television signals includes a sequence of "samples", each sample representing the amplitude of a represented sound wave at a particular point in time. If each sample is represented by one byte (8 bits) of memory, the measured sound amplitude may be digitized to $2^8$ (i.e., 256) different amplitude levels thereby fairly accurately representing the amplitude of the actual measures sound. If each sample is represented by 2 bytes (16 bits) of memory, the measured sound amplitude may be digitized to $2^{16}$ (i.e., 65,536) different amplitude levels thereby giving the sample a higher degree of fidelity with the amplitude of the actual measured sound. Digital television stations typically transmit audio samples for a given program at a sampling rate of 48,000 samples per second. This high sampling rate permits for the fairly accurate representation of all sounds within the audible frequency spectrum of a human being.

Thus, in digital television, video data for a given program is transmitted in the form of frames at a certain frame rate and audio data for a given program is transmitted in the form of samples a certain sampling rate. Video data and audio data are received on average at the same rate that the data is transmitted.

It is critical that the video and audio data be presented at the same rate as the data is transmitted. If the video and audio are presented too quickly, the buffer within the receiver will run out of video and audio data resulting in the need for the receiver to wait for the next data. However, the next image frame or audio sample should be presented at a predetermined time after the previous image was shown to maintain a relatively constant frame and sample presentation rate. During this waiting period, if the next image frame or audio sample is not received before the appointed presentation time, the last received image frame and audio sample may be repeated often resulting in a noticeable presentation degradation. If the video and audio are presented too slowly, the receiver will overflow resulting in image frames and audio samples being dropped. This may result in the presentation skipping image frames or audio samples also resulting in presentation degradation.

Thus, there is a need to ensure that image frames and audio samples are presented at the receiver at the same rate that the image frames and audio samples are transmitted by the broadcaster so as to avoid overflowing or depleting the buffer at the receiver. To solve this problem, transmitters typically have a local clock hereinafter referred to as the transmitter clock. Likewise, the receiver has a single clock hereinafter referred to as the receiver clock that controls the presentation speed of both the image frames and audio samples. Since the presentation speed of the image frames (hereinafter, "the video presentation speed") and the presentation speed of the audio samples (hereinafter, "the audio presentation speed") are based on the same clock, the presentation speeds of the images and audio proportionally speed up or slow down together. For example, if 29.94 image frames and 48,000 audio samples are ideally to be presented each second, then the single local receiver clock ensures that for each image frame displayed, an average of 1603.206412826 (48,000/29.94) audio samples are sounded no matter whether the local receiver clock is presenting image frames slightly faster or slower than 29.94 frames per second to maintain synchronization with the transmitter clock.

This method has the advantage of maintaining synchronization between the video presentation and the audio presentation. Furthermore, it has the advantage of having only one local receiver clock thus simplifying the synchronization process. However, this method requires that the video and audio presentation speed be proportionally slowed down or sped up together. Therefore, what are desired are methods and systems for allowing more flexible control of the video and audio presentation speeds.

SUMMARY OF THE INVENTION

Methods and systems are disclosed in which the presentation speed of the digital video frames is controlled separate from the presentation speed of the digital audio samples.

Independent control of the presentation speeds of the digital video frames and digital audio samples may be beneficial when the video is being provided from one program source and the audio is provided from another program source. For example, a viewer might watch a football game, but instead of listening to the accompanying football commentary, the viewer may listen to the local news. In addition, the viewer may listen to broadcasts having different sampling rates than a television broadcast such as, for example, music broadcasted from a compact disc source. Thus, a viewer may watch a football game while listening to music rather than football commentary. By separately controlling the presentation speed of the digital video frames and digital audio samples, the video and audio presentation remains high quality even if presented from different programs or sources.

The independent control may be accomplished by using a video clock to control the video presentation speed and a separate and independent audio clock to control the audio presentation speed. To control the video presentation speed, a comparator compares a program clock reference in a video packet with a local time. A video clock controller then speeds up or slows down the video clock as needed to be back on schedule. To control the audio presentation speed, a comparator compares a program clock reference in an audio packet with the local time. An audio clock controller then speeds up or slows down the audio clock as needed to be back on schedule.

Additional advantages of the invention will be set forth in the description which follows, and in part will be obvious from the description, or may be learned by the practice of the invention. The advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Methods and systems are described for independently controlling the presentation speeds of video frames and audio samples. For example, in a screen-in-screen display, there may be a smaller video frame showing one television channel displayed within a larger frame showing another television channel. Such screen-in-screen displays thus allow viewers to visually monitor more than one channel at a time. However, the sound for only one of these channels will be sounded. If the audio and video relate to the same channel, then the audio and video may be presented together. However, in the screen-in-screen display, one of the video frames relates to a different channel than the sounded audio. In addition, a viewer may desire to view a television program, but instead of listening to the accompanying audio, may listen to a compact disk through the television speakers. The present invention allows for the independent presentation speed control of this unrelated video and audio thus allowing the video and audio to synchronize properly to their respective channels.

In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description.

In one embodiment, steps according to the present invention are embodied in machine-executable software instructions, and the present invention is carried out in a processing system by a processor executing the instructions, as will be described in greater detail below. In other embodiments, hardwired circuitry may be used in place of, or in combination with, software instructions to implement the present invention.

The present invention may be implemented in a wide-variety of receiver systems. One such receiver system is described herein for illustrative purposes only. In the example system, a set-top box is connected to a television, one or more servers over the Internet, and to a television programming source. The receiver system optionally includes a processing system that executes browser software to enable a user to browse through World-Wide Web pages displayed on the television using a remote control device. It should be noted, however, the access to the Internet is not a required feature of the present invention.

In one embodiment, the present invention is included in a system known as WebTV™ (WebTV), which uses a standard television set as a display device for browsing the Web, which connects to a conventional network, such as the Internet, using standard telephone, ISDN, or similar communication lines, and which is connected to a television programming source. In accordance with the present invention, a user of a WebTV client system can utilize WebTV network services provided by one or more remote WebTV servers. The WebTV network services are used in conjunction with software running in a WebTV client system to browse the Web, send electronic mail, and to make use of the Internet in various other ways. The WebTV servers function as proxies by retrieving, from a remote server, Web pages, television programming, or other data requested by a WebTV client system and then transmitting the requested information to the WebTV client system.

Figure 1:
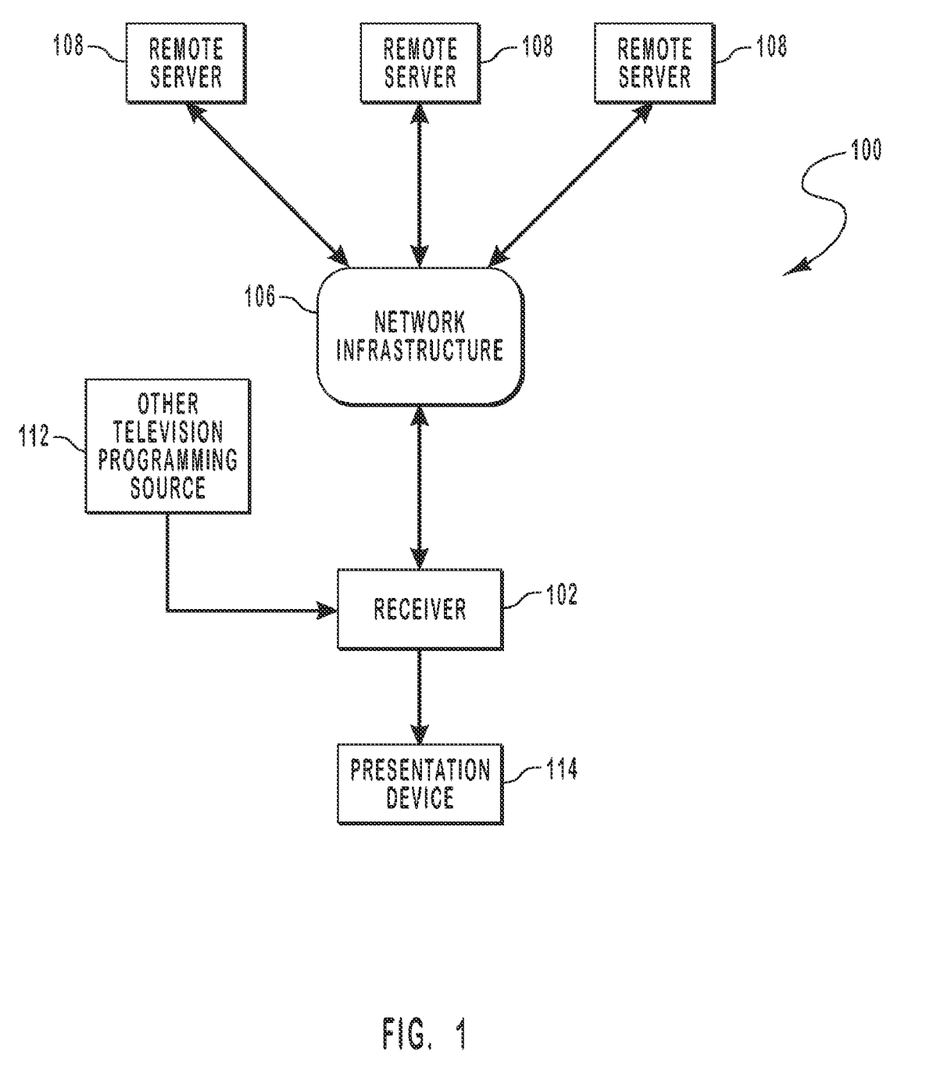
FIG. 1 schematically illustrates a suitable operating environment for the present invention.

FIG. 1 illustrates a configuration 100 of a WebTV network which represents a suitable operating environment for the present invention. A WebTV receiver 102 receives a television programming signal from either a remote server 108 over a network infrastructure 106 such as the Internet and/or from another television programming source 112 such as conventional television terrestrial airwave, cable, or satellite broadcasters.

The particular source of the television programming is not important to the present invention. The only requirement of the source is its ability to transmit or relay television programming. It is anticipated that the principles of the present invention may be applied to television broadcasts or multicasts over the Internet as well. No matter what the source of the television programming, the television programming, when tuned, is ultimately presented on the presentation device 114 which may be a standard television set or a computer monitor with an accompanying speaker.

In this description and in the claims, a "television program" is to be broadly construed as including any signal that has both a video component and an audio component. Furthermore, a "program clock reference" is defined to include any indication, express or implied, of a reference time corresponding to the television program transmitted.

Figure 2:
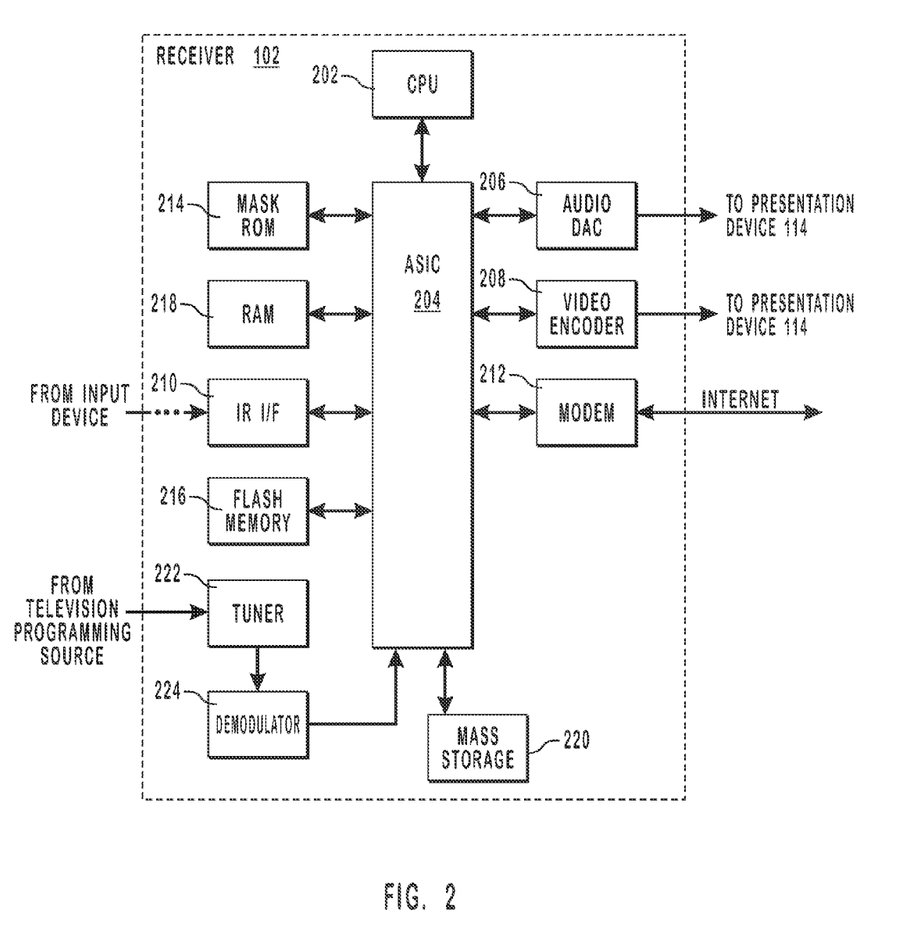
FIG. 2 schematically illustrates the internal physical components of the receiver of FIG. 1.

FIG. 2 shows the internal physical components of the receiver 102. Operation of the receiver 102 is controlled by a CPU 202, which is coupled to an Application-Specific Integrated Circuit (ASIC) 204. The CPU 202 executes software designed to implement features of the present invention. ASIC 204 contains circuitry which is used to implement certain functions of the receiver 102. ASIC 204 is coupled to an audio digital-to-analog converter 206 which provides audio output to presentation device 114. In addition, ASIC 204 is coupled to a video encoder 208 which provides video output to the presentation device 114. The receiver 102 also includes an input interface for receiving control input from a user. For example, the receiver 102 includes an IR interface 210 that detects input infrared signals transmitted by a remote control. The IR interface 210 responds to such user input by providing corresponding electrical signals to ASIC 204. A modem 212 is coupled to ASIC 204 to provide connections to the network infrastructure 106 in cases when the television programming is received over the Internet. Other connector devices may be used as appropriate to accommodate the particular medium for connecting to the remote server 108 over the network infrastructure 106. For example, an Ethernet card may be used when connecting to the remote server 108 over an Ethernet.

The receiver 102 also includes one or more memory devices. For example, the receiver 102 might include a mask Read Only Memory (ROM) 214, a Flash memory 216, a Random Access Memory (RAM) 218 and/or a mass storage device 220. Flash memory 216 is a conventional flash memory device that can be written to (programmed) and erased electronically. Flash memory 216 provides storage of browser software and or data needed to access remote servers 208. The mass storage device 220 may be used to input software or data to the client or to download software or data received over the network infrastructure 106. The mass storage device 220 includes any suitable medium for storing machine-executable instructions, such as magnetic disks, optical disks, and the like.

In traditional television programming broadcasting such as terrestrial airwave, cable and satellite, the broadcast signal includes multiple channels of programming. In order to obtain the desired channel, the desired channel must first be tuned from the broadcasted signal. The receiver 102 includes a tuner 222 that tunes the desired channel from the broadcast signal. The tuner 222 then provides the tuned signal to a demodulator 224 which demodulates the signal for further processing by the ASIC 204.

Figure 3:
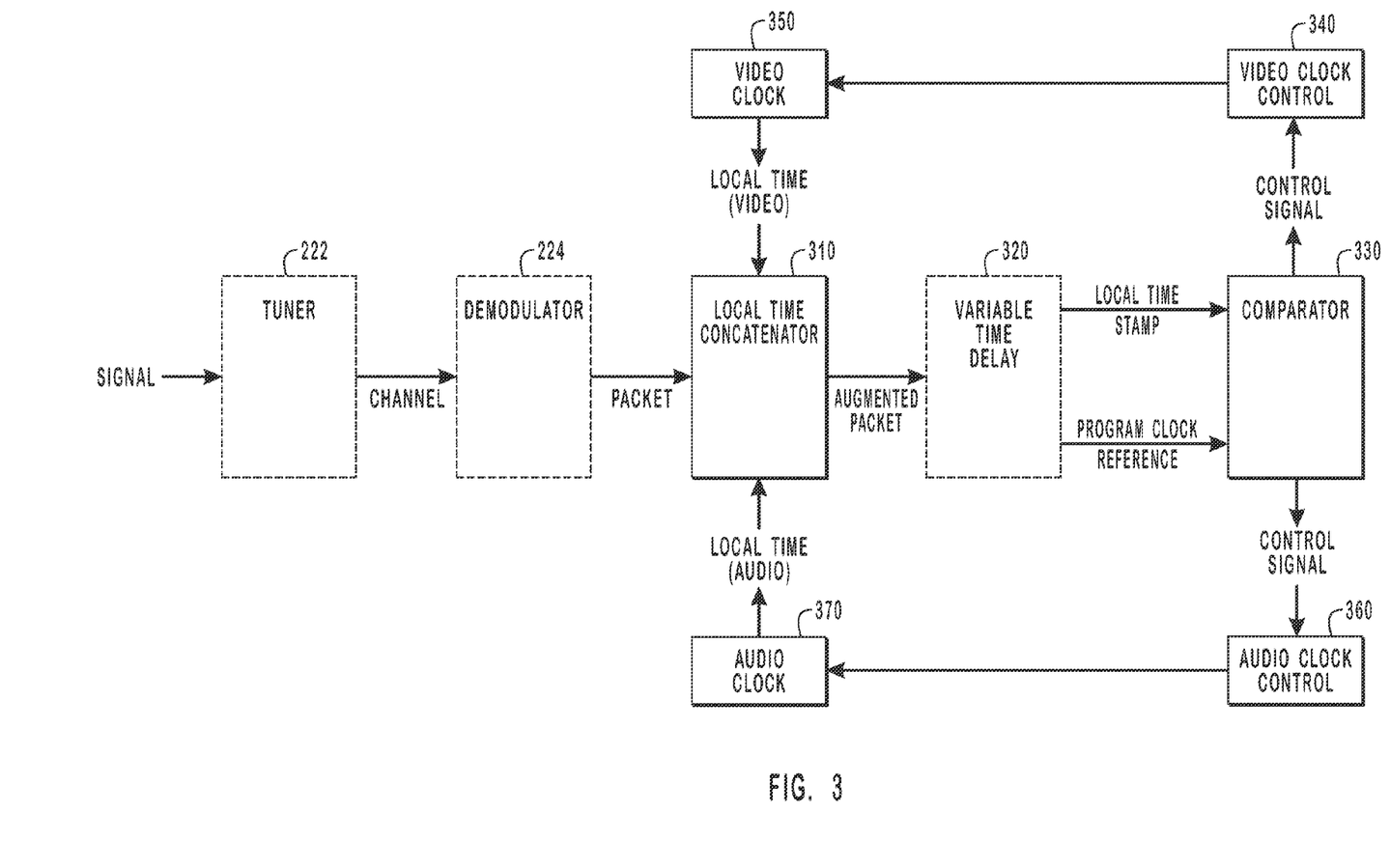
FIG. 3 schematically illustrates various modules of the receiver of FIG. 1 that operate to independently control a video clock and an audio clock associated with the receiver.

FIG. 3 illustrates several modules that are implemented in hardware and/or software in the receiver 102. The operation of the modules shown in FIG. 3 will be described by reference to FIG. 4 which shows a method in accordance with the present invention. First, the receiver 102 receives a television programming signal that includes video signals and audio signals (step 410 of FIG. 4). The tuner 222 then tunes to at least one video signal and at least one audio signal (step 420).

Figure 4:
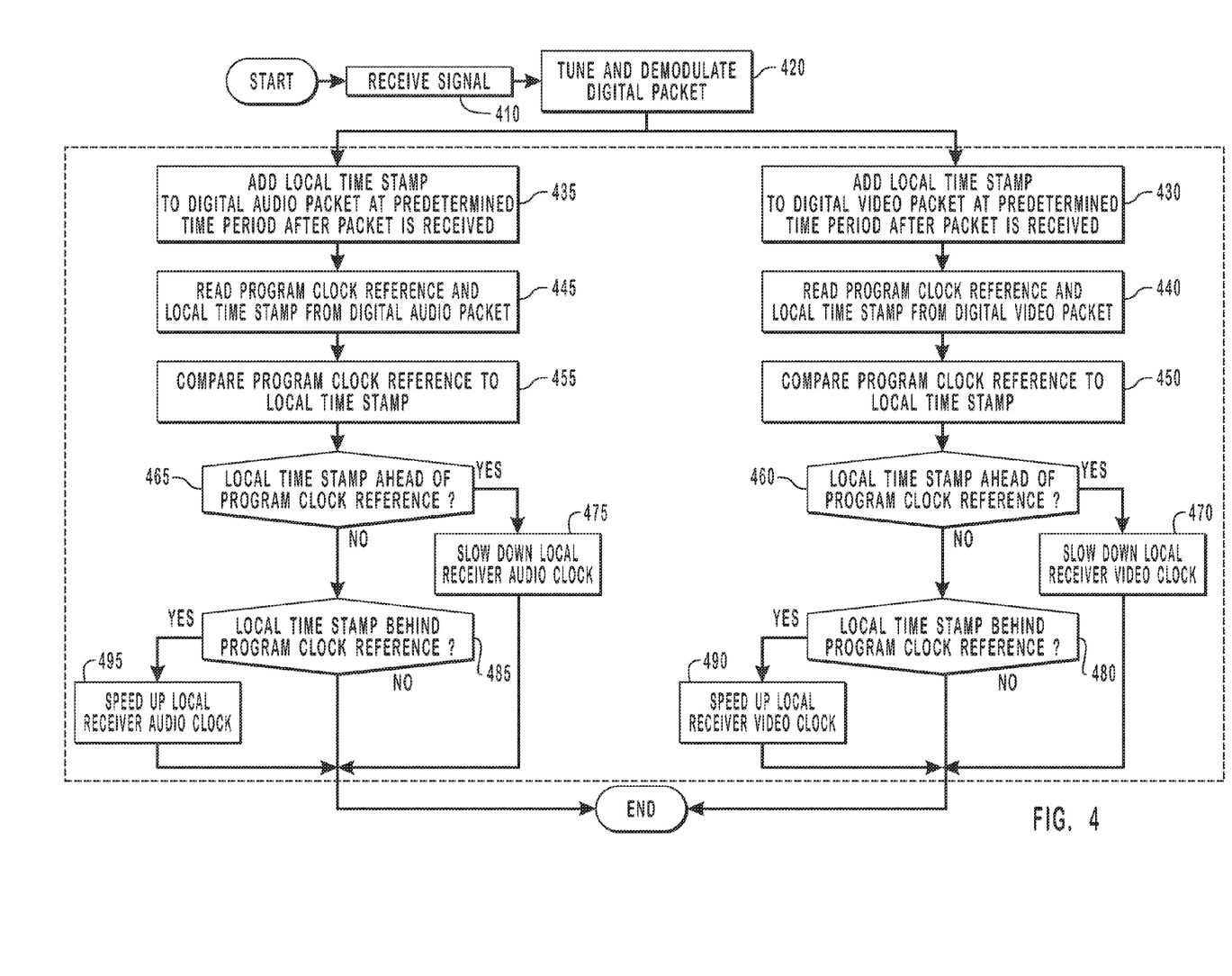
FIG. 4 illustrates a flowchart of a method of independently controlling the video and audio clocks.

The video and audio signals may be from the same channel as in conventional television viewing in which the audio corresponds to the video. However, the video and audio signals may also be from different channels. For example, a screen-in-screen television may show, in large view, the video from the video signal while the audio from the audio signal corresponds to the smaller screen of video from a different channel. Thus, the video and audio signals may be from different channels and thus may be unrelated.

The demodulator then demodulates digital packets from the video and audio signals (also step 420) so that the packets may be evaluated digitally. Often, these digital packets will include a broadcaster-provided program clock reference that may be used in timing the presentation of the channel. By comparing the program clock reference to the local time, the receiver determines whether or not to speed up or slow down the local clock so as to present the channel at the same rate as it is being transmitted.

Figure 5A:
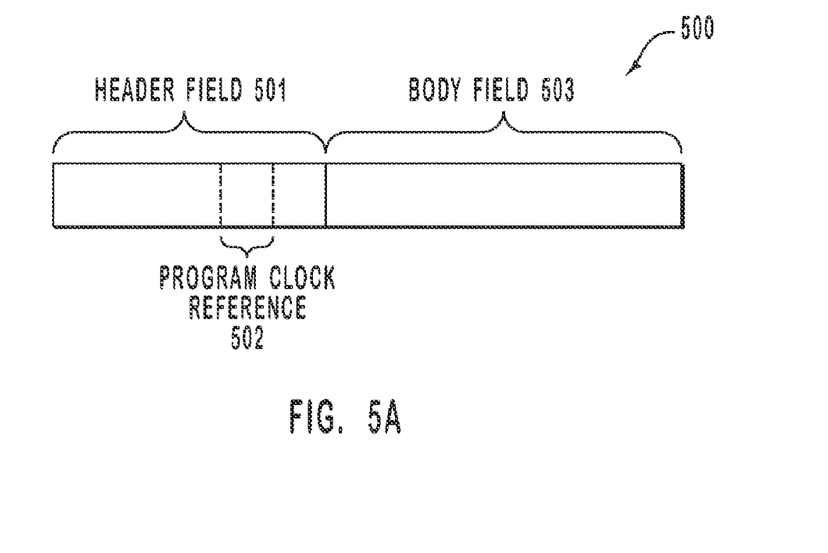
FIG. 5A illustrates a data structure of a digital packet having a program clock reference.

FIG. 5A illustrates an example data structure of a digital packet 500 that may be processed using the structure of FIG. 3 and the method of FIG. 4. The digital packet 500 includes a header field 501 that includes the program clock reference 502. The digital packet 500 also includes a body field 503 that includes the actual video or audio data that is to be presented. The data structure 500 is just one example of the data structure.

The flowchart of FIG. 4 then branches showing processing of a digital audio packet in the left branch, and showing processing of a digital video packet in the right branch. The remainder of the method of FIG. 4 which is now described represents an example of a step for independently controlling a video clock that controls the timing of the video presentation speed of the plurality of digital video packets, and an audio clock that controls the timing of the audio presentation speed of the audio represented by the plurality of digital audio packets.

Regardless of whether the digital packet is a digital video or audio packet, the receiver 102 adds a local time stamp to the digital packet (step 430 for video packets, and step 435 for audio packets). A "local time stamp" is defined as any indication of the time reference of a local clock that controls presentation speed. This local time stamp may be added to the digital packet in any fashion so long as it can later be read from the digital packet.

Figure 5B:
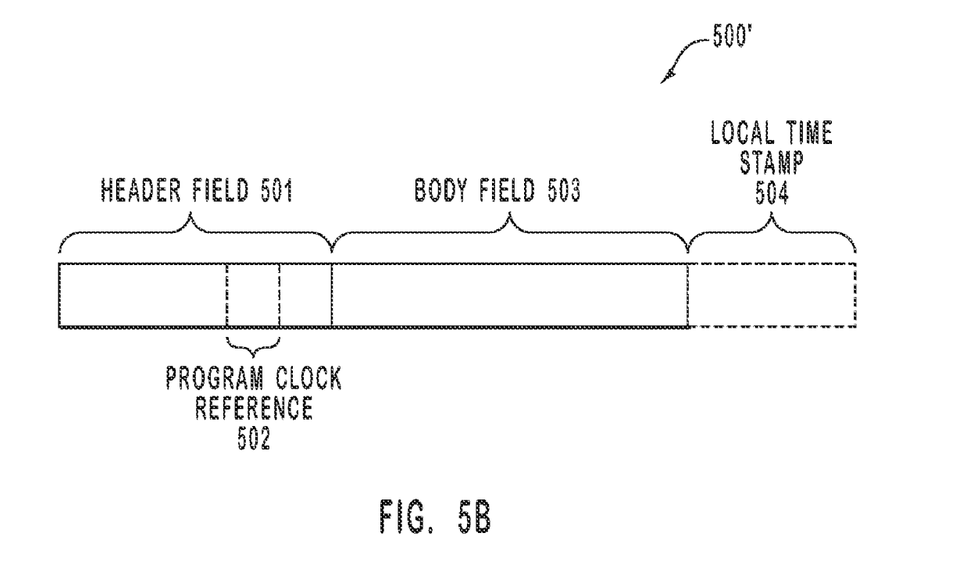
FIG. 5B illustrates a data structure of a digital packet having a program clock reference and an added local time stamp.

FIG. 5B illustrates the example data structure of the digital packet 500 in which a local time stamp field 504 is concatenated to the original data structure. This local time may be concatenated by the local time concatenator 310 of FIG. 3. The augmented data structure is represented by 500'. This local time stamp 504 is added to the digital packet 500 at a relatively constant time period after the digital packet 500 is received by the receiver 102. For example, the local time stamp 504 may be added to the digital packet 500 immediately after the relatively constant time period processes of tuning and demodulating (step 420) the digital packet 500.

The addition of the local time stamp 504 to the digital packet 500 at a relatively constant time period after the digital packet 500 is received allows for variable time processes to occur before the receiver 102 evaluates the program clock reference 502 to determine whether the speed of the local clock needs to be adjusted. This optional variable process(es) is represented in FIG. 3 by dotted box 320. Although adding the local time stamp allows for variable time processes to be performed before the program clock reference is evaluated, the addition of the local time stamp is not necessary to the operation of the invention.

At some point, whether it be after variable time processes or not, the local time stamp 504, if any, and the program clock reference are read from the digital packet 500 (step 440 for video packets and step 445 for audio packets). The program clock reference is then evaluated by, for example, comparing the program clock reference to the local time stamp (step 450 for video packets and step 455 for audio packets) if such a local time stamp exists. This may be accomplished by the comparator 330 of FIG. 3. If there is not such local time stamp, the comparator 330 may compare the program clock reference to the local time that the comparator 330 is aware of.

The remainder of the method operates to independently control the video clock 350 and the audio clock 370 based on the program clock references. For example, in evaluating a program clock reference in a video packet, if the local time (as represented by the local time stamp or as represented by the local time known to the comparator) indicates the video presentation is ahead of schedule as when the video buffer is in danger of being depleted (YES in decision block 460), then the comparator 330 signals a video clock control 340 to slow down the local video clock 350 (step 470). On the other hand, if the local time indicates the video presentation is behind schedule as when the video buffer is in danger of overflowing (NO in decision block 460 and YES in decision block 480), then the comparator 330 signals the video clock control 340 to speed up the local video clock 350 (step 490). If the local time indicates that the video presentation is neither significantly behind nor ahead of schedule (NO in both decision blocks 460 and 480), then the comparator does not signal the video clock control to make any video presentation speed adjustments. As the stream of video packets are received and evaluated by the receiver 102, the comparator may evaluate a number of program clock references each second. Thus, the comparator has the opportunity to adjust the video presentation speed often so that the video presentation speed does not vary much ahead of or behind schedule.

The structure of FIG. 3 also operates to independently control the audio presentation speed. For example, in evaluating the program clock reference within an audio packet, if the local time indicates the audio presentation is ahead of schedule as when the audio buffer is in danger of being depleted (YES in decision block 465), then the comparator 330 signals an audio clock control 360 to slow down the local audio clock 370 (step 475). On the other hand, if the local time indicates the audio presentation is behind schedule as when the audio buffer is in danger of overflowing (NO in decision block 465 and YES in decision block 485), then the comparator 330 signals the audio clock control 360 to speed up the local audio clock 370 (step 495). If the local time indicates that the audio presentation is neither significantly behind nor ahead of schedule (NO in both decision blocks 465 and 485), then the comparator does not signal the audio clock control to make any audio presentation speed adjustments. The comparator has the opportunity to adjust the audio presentation speed often so that the audio presentation speed also does not vary much ahead of or behind schedule.

Thus, the present invention retains the advantage of the prior art in that the receiver buffer rarely depletes or overflows thereby resulting in high picture and audio quality. In addition, the present invention enables for the independent control of the audio and video presentation speeds. Thus, the video clock may be speed up while the audio clock is slowed down, and vice versa.

This independent control of the presentation speeds of the video and audio packets may be beneficial when the video is being provided from one program source and the audio is provided from another program source. For example, a viewer might watch a football game, but instead of listening to the accompanying football commentary, the viewer may listen to the local news. In addition, the viewer may listen to broadcasts having different sampling rates than a television broadcast such as, for example, music broadcasted from a compact disc source. Thus, a viewer may watch a football game while listening to music rather than football commentary. By separately controlling the presentation speed of the digital video frames and digital audio samples, the video and audio presentation remains high quality even if presented from different programs.

The above describes methods and systems for controlling the audio and video presentation speeds independently. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A digital receiver that is configured to receive a digital video signal representing a plurality of digital video packets and a digital audio signal representing a plurality of digital audio packets, the digital receiver being configured to implement a method of independently timing the presentation of the video information of the digital video packets with respect to the timing of the presentation of the audio information of the digital audio packets so that the video information and the audio information may be accurately timed even if they are from different unrelated programs, the digital receiver comprising:

one or more storage media having machine-executable instructions for implementing the method, wherein the method comprises:

an act of receiving a digital video signal and a digital audio signal;

an act of extracting a plurality of digital video packets from the digital video signal;

an act of extracting a plurality of digital audio packets from the digital audio signal;

an act of adding a local audio time stamp to a digital audio packet at a substantially constant time period, packet to packet, after the receiver receives the digital audio packet;

an act of comparing a program clock reference within the digital audio packet to the local audio time stamp;

an act of using an audio clock, based at least in part on the comparison of the program clock reference to the local audio time stamp, to control the timing of the presentation of the audio information represented by the plurality of digital audio packets, wherein the audio clock operates separately and independently of the video clock; and an act of using a video clock to control the timing of the presentation of the video information represented by the plurality of digital video packets.

2. The digital receiver recited in claim 1, wherein the act of using the audio clock to control the timing of the presentation of the audio information represented by the plurality of digital audio packets comprises an act of controlling the speed of the audio clock based on the comparison of the program clock reference to the local audio time stamp.

3. The digital receiver recited in claim 1, wherein the method further comprises the following:
   an act of adding a local video time stamp to a digital video packet at a substantially constant time period, packet to packet, after the receiver receives the digital video packet; and
   an act of comparing a program clock reference within the digital video packet to the local audio time stamp.

4. The digital receiver recited in claim 3, wherein the act of using the video clock to control the timing of the presentation of the video information represented by the plurality of digital video packets comprises an act of controlling the speed of the video clock based on the comparison of the program clock reference to the local video time stamp.

5. A method that is implemented by a digital receiver that is configured to receive a digital video signal representing a plurality of digital video packets and a digital audio signal representing a plurality of digital audio packets, the digital receiver being configured to implement a method of independently timing the presentation of the video information of the digital video packets with respect to the timing of the presentation of the audio information of the digital audio packets so that the video information and the audio information may be accurately timed even if they are from different unrelated programs, the method comprising:
   an act of receiving a digital video signal and a digital audio signal;
   an act of extracting a plurality of digital video packets from the digital video signal;
   an act of extracting a plurality of digital audio packets from the digital audio signal;
   an act of adding a local audio time stamp to a digital audio packet at a substantially constant time period, packet to packet, after the receiver receives the digital audio packet;
   an act of comparing a program clock reference within the digital audio packet to the local audio time stamp;
   an act of using an audio clock, based at least in part on the comparison of the program clock reference to the local audio time stamp, to control the timing of the presentation of the audio information represented by the plurality of digital audio packets, wherein the audio clock operates separately and independently of the video clock; and
   an act of using a video clock to control the timing of the presentation of the video information represented by the plurality of digital video packets.

6. The method recited in claim 5, wherein the act of using the audio clock to control the timing of the presentation of the audio information represented by the plurality of digital audio packets comprises an act of controlling the speed of the audio clock based on the comparison of the program clock reference to the local audio time stamp.

7. The method recited in claim 1, wherein the method further comprises the following:
   an act of adding a local video time stamp to a digital video packet at a substantially constant time period, packet to packet, after the receiver receives the digital video packet; and
   an act of comparing a program clock reference within the digital video packet to the local audio time stamp.

8. The method recited in claim 7, wherein the act of using the video clock to control the timing of the presentation of the video information represented by the plurality of digital video packets comprises an act of controlling the speed of the video clock based on the comparison of the program clock reference to the local video time stamp.

9. A storage media for use by a digital receiver that is configured to receive a digital video signal representing a plurality of digital video packets and a digital audio signal representing a plurality of digital audio packets,
   the storage media storing machine-executable instructions for the digital receiver to implement a method of independently timing the presentation of the video information of the digital video packets with respect to the timing of the presentation of the audio information of the digital audio packets so that the video information and the audio information may be accurately timed even if they are from different unrelated programs, wherein the method includes:
   an act of receiving a digital video signal and a digital audio signal;
   an act of extracting a plurality of digital video packets from the digital video signal;
   an act of extracting a plurality of digital audio packets from the digital audio signal;
      an act of adding a local audio time stamp to a digital audio packet at a substantially constant time period, packet to packet, after the receiver receives the digital audio packet;
      an act of comparing a program clock reference within the digital audio packet to the local audio time stamp;
      an act of using an audio clock, based at least in part on the comparison of the program clock reference to the local audio time stamp, to control the timing of the presentation of the audio information represented by the plurality of digital audio packets, wherein the audio clock operates separately and independently of the video clock; and
      an act of using a video clock to control the timing of the presentation of the video information represented by the plurality of digital video packets.

10. The storage media recited in claim 9, wherein the act of using the audio clock to control the timing of the presentation of the audio information represented by the plurality of digital audio packets comprises an act of controlling the speed of the audio clock based on the comparison of the program clock reference to the local audio time stamp.

11. The storage media recited in claim 9, wherein the method further comprises the following:
   an act of adding a local video time stamp to a digital video packet at a substantially constant time period, packet to packet, after the receiver receives the digital video packet; and
   an act of comparing a program clock reference within the digital video packet to the local audio time stamp.

12. The storage media recited in claim 11, wherein the act of using the video clock to control the timing of the presentation of the video information represented by the plurality of digital video packets comprises an act of controlling the speed of the video clock based on the comparison of the program clock reference to the local video time stamp.

* * * * *